United States Patent

Harada et al.

(10) Patent No.: US 9,162,526 B2
(45) Date of Patent: Oct. 20, 2015

(54) WHEEL SUPPORT DEVICE

(71) Applicant: JTEKT Corporation, Osaka-shi, Osaka (JP)

(72) Inventors: Katsuyuki Harada, Yamatokoriyama (JP); Hiroshi Anno, Sakai (JP)

(73) Assignee: JTEKT CORPORATION, Osaka-shi (JP)

( * ) Notice: Subject to any disclaimer, the term of this patent is extended or adjusted under 35 U.S.C. 154(b) by 257 days.

(21) Appl. No.: 13/774,219

(22) Filed: Feb. 22, 2013

(65) Prior Publication Data

US 2013/0229047 A1 Sep. 5, 2013

(30) Foreign Application Priority Data

Mar. 2, 2012 (JP) ................................. 2012-046448

(51) Int. Cl.
| | |
|---|---|
| *B60B 27/06* | (2006.01) |
| *F16D 1/076* | (2006.01) |
| *B60B 27/00* | (2006.01) |

(Continued)

(52) U.S. Cl.
CPC ........... *B60B 27/065* (2013.01); *B60B 27/0031* (2013.01); *B60B 27/0036* (2013.01); *F16D 1/076* (2013.01); *B60B 27/00* (2013.01); *B60B 27/0005* (2013.01); *B60B 2310/305* (2013.01); *B60B 2360/10* (2013.01); *B60Y 2200/10* (2013.01); *B60Y 2200/20* (2013.01); *F16C 19/186* (2013.01); *F16C 33/586* (2013.01)

(58) Field of Classification Search
CPC .. B60B 27/00; B60B 27/005; B60B 27/0084; B60B 27/0036; B60B 27/0042; B60B 27/065; B60B 27/0094

USPC ............. 301/6.1, 68, 35.62, 105.1, 110; 384/544, 589, 537
See application file for complete search history.

(56) References Cited

U.S. PATENT DOCUMENTS

| | | | |
|---|---|---|---|
| 6,672,679 B2 * | 1/2004 | Kaneko | 301/105.1 |
| 2003/0155803 A1 * | 8/2003 | Kayama et al. | 301/6.1 |

(Continued)

FOREIGN PATENT DOCUMENTS

| | | |
|---|---|---|
| DE | 10 2005 018 127 A1 | 10/2006 |
| DE | 10 2006 032 159 A1 | 1/2008 |

(Continued)

OTHER PUBLICATIONS

Jun. 6, 2013 Extended European Search Report issued in European Patent Application No. EP 13156911.3.

*Primary Examiner* — S. Joseph Morano
*Assistant Examiner* — Jean Charleston
(74) *Attorney, Agent, or Firm* — Oliff PLC

(57) ABSTRACT

A rotary ring of a hub unit has an annular end face on one side in the axial direction, and a tapered outer periphery in a radially outer region of the end face. The diameter of the tapered outer periphery increases toward the other side in the axial direction. An outer ring of a joint has an annular end face on the other side in the axial direction, and had a tapered inner periphery in a radially outer region of the end face. The diameter of the tapered inner periphery increases toward the other side in the axial direction, and the tapered inner periphery faces the tapered outer periphery. Splines are formed in the tapered outer periphery and splines are formed in the tapered inner periphery, and the splines of the tapered outer periphery and the splines of the tapered inner periphery mesh with each other.

2 Claims, 4 Drawing Sheets

(51) Int. Cl.
   *F16C 19/18*   (2006.01)
   *F16C 33/58*   (2006.01)

(56) References Cited

U.S. PATENT DOCUMENTS

2006/0117903 A1*  6/2006  Kobayashi et al. ............ 74/537

2010/0038958 A1  2/2010  Tsuzaki et al.

FOREIGN PATENT DOCUMENTS

| EP | 0 048 101 A1 | 3/1982 |
| EP | 2 103 451 A1 | 9/2009 |
| JP | A-2008-174178 | 7/2008 |
| JP | A-2008-284920 | 11/2008 |

* cited by examiner

WHEEL SUPPORT DEVICE

INCORPORATION BY REFERENCE

The disclosure of Japanese Patent Application No. 2012-046448 filed on Mar. 2, 2012 including the specification, drawings and abstract, is incorporated herein by reference in its entirety.

BACKGROUND OF THE INVENTION

1. Field of the Invention

The invention relates to a wheel support device.

2. Description of the Related Art

In order to support a wheel such that the wheel is rotatable with respect to a suspension provided on a body of a vehicle, for example, a wheel support device shown in FIG. 4 is used. The wheel support device includes a hub unit 80 and a joint 90 that transmits torque to the hub unit 80.

The hub unit 80 includes a fixed ring 81, a rotary ring 82, and rolling elements 83. Internal splines 84 are formed in the inner periphery of the rotary ring 82. The fixed ring 81 is fixed to the suspension. The wheel is connected to the rotary ring 82. The rolling elements 83 are arranged between the fixed ring 81 and the rotary ring 82. The joint 90 has an outer ring 89. The outer ring 89 has a tubular body portion 88 and a shaft portion 87. The shaft portion 87 extends from the body portion 88 in the axial direction. External splines 86 that mesh with the internal splines 84 are formed on the outer periphery of the shaft portion 87 so that torque transmission between the hub unit 80 and the joint 90 is allowed.

When the configuration shown in FIG. 4 is employed, many processes are required to assemble the hub unit 80 and the joint 90 together. That is, the following processes are required. First, an alignment for positioning the hub unit 80 and the outer ring 89 of the joint 90 such that the hub unit 80 and the outer ring 89 extend along the same straight line is performed (first process). The shaft portion 87 of the joint 90 is press-fitted (temporarily press-fitted) into the rotary ring 82, and the distal end of the shaft portion 87 is protruded from an axial end face (left end face in FIG. 4) of the rotary ring 82 (second process). A temporary nut (not shown) is screwed to a threaded portion 87a formed at the distal end of the shaft portion 87 (third process). By screwing the temporary nut to the threaded portion 87a, the shaft portion 87 is press-fitted (fully press-fitted) into the rotary ring 82 until no gap remains between the rotary ring 82 of the hub unit 80 and the outer ring 89 of the joint 90 (fourth process). The temporary nut is removed from the shaft portion 87 (fifth process). A nut 85 is fastened to the threaded portion 87a of the shaft portion 87 (sixth process). The nut 85 is fixed to the axial end face of the rotary ring 82 by crimping, or the like, to prevent loosening of the nut 85 (seventh process). As shown in FIG. 4, the shaft portion 87 is press-fitted into the rotary ring 82 so that the external splines 86 that extend in the axial direction mesh with the internal splines 84 that extend in the axial direction. Therefore, particularly strict dimensional control is required to form the splines 86, 84. As a result, many man-hours are required also in the process of forming the splines.

Therefore, in order to make it easier to assemble a hub unit and a joint together, for example, a wheel support device (wheel bearing device) described in Japanese Patent Application Publication No. 2008-284920 (JP 2008-284920 A) (see FIG. 4) is used. In the wheel support device, first splines are formed in an annular side face of a rotary ring of the hub unit, the annular side face being on one side of the rotary ring in the axial direction. In addition, second splines that mesh with the first splines are formed in an annular side face of an outer ring of the joint, the annular side face being on the other side of the outer ring in the axial direction. The first splines are formed in substantially the entirety of the annular side face of the rotary ring. The second splines are formed in substantially the entirety of the annular side face of the outer ring.

In the case of the wheel support device described in JP 2008-284920 A (see FIG. 4), the hub unit and the joint are assembled together in the following manner. First, the hub unit and the outer ring of the joint are arranged so as to face each other in the axial direction. Then, the first splines of the hub unit and the second splines of the joint are meshed with each other. After that, the hub unit and the outer ring of the joint are fastened together with a bolt.

As described above, in the case of the wheel support device described in JP 2008-284920 A (see FIG. 4), it is easy to assemble the hub unit and the joint together. However, as described above, the first splines and the second splines are formed in substantially the entirety of the corresponding annular side faces. Therefore, in order to form the first and second splines through plastic working with the use of, for example, a press, a large pressing load is required. In addition, in order to accurately form the entirety of the splines, a high-level working technique is required. Therefore, for example, there is a wheel support device in which splines are formed only in an outer peripheral region of an annular side face of a rotary ring of a hub unit, the annular side face being on one side of the rotary ring in the axial direction (for example, see Japanese Patent Application Publication No. 2008-174178 (JP 2008-174178 A) (see FIG. 3)).

In the hub unit described in JP 2008-174178 A (see FIG. 3), splines need to be formed only in the outer peripheral region of the annular side face. Therefore, a press load that is required to form the splines through plastic working with the use of, for example, a press is smaller than that in the case of the hub unit described in JP 2008-284920 A (see FIG. 4). Therefore, it is easier to accurately form the splines than in the case of the hub unit described in JP 2008-284920 A.

However, in the case where the splines are formed only in part of the annular side face, contact pressure that acts on the splines may increase as transmission torque increases. That is, in the case where the splines are formed in part of the annular side face, the magnitude of torque that is transmitted between the joint and the hub unit may be limited.

SUMMARY OF THE INVENTION

It is an object of the invention to provide a wheel support device that has a spline structure that is able to ensure a transmittable torque equivalent to the related art while forming splines on part of an axial end face of each of a hub unit and a joint.

An aspect of the invention relates to a wheel support device, including: a hub unit that includes a fixed ring that is fixed to a vehicle body-side member, a rotary ring to which a wheel is fitted, and rolling elements that are provided between the fixed ring and the rotary ring; and a joint that is provided on one side of the hub unit in an axial direction, and that has a torque transmission ring that transmits rotary torque to the rotary ring. The rotary ring has an annular end face on one side in the axial direction, and has a tapered outer periphery in a radially outer region of the end face. A diameter of the tapered outer periphery increases toward the other side in the axial direction. The torque transmission ring has an annular end face on the other side in the axial direction, and has a tapered inner periphery in a radially outer region of the end face. A diameter of the tapered inner periphery increases toward the other side in the axial direction and the tapered inner periphery faces the tapered outer periphery. Splines are formed in the tapered outer periphery and splines are formed in the tapered inner periphery, and the splines of the tapered outer periphery and the splines of the tapered inner periphery mesh with each other.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

Figure 1:
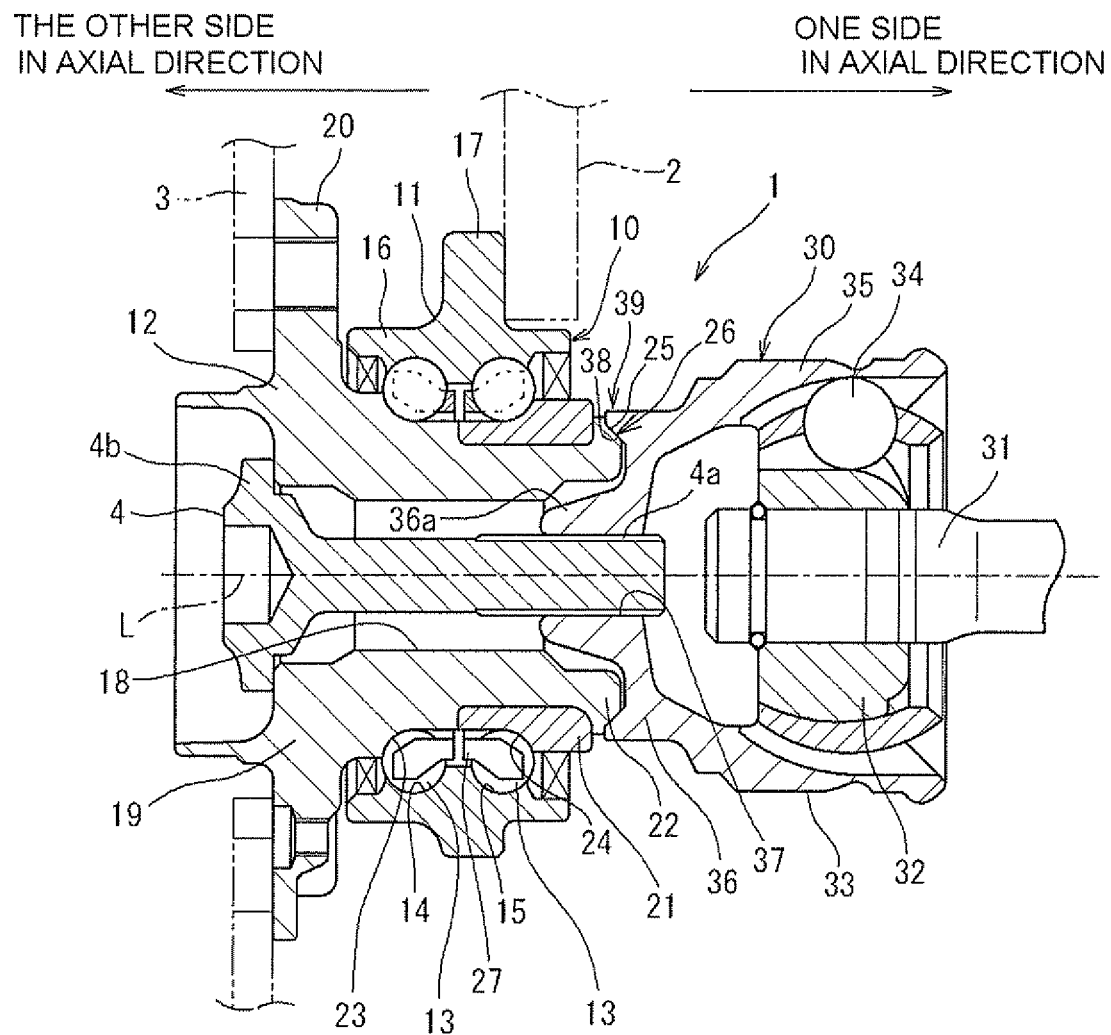
FIG. 1 a longitudinal sectional view that shows a wheel support device according to an embodiment of the invention.

An embodiment of the invention will be described with reference to the accompanying drawings. FIG. 1 is a longitudinal sectional view that shows a wheel support device 1 that includes a hub unit 10 and a joint 30 according to one embodiment of the invention. The hub unit 10 is fitted to a suspension 2 provided on a body of a vehicle, and is used to support a wheel 3 such that the wheel 3 is rotatable with respect to the suspension 2. The joint 30 is coupled to the hub unit 10, and is used to transmit rotary torque to a rotary ring 12 of the hub unit 10. The hub unit 10 and the joint 30 are fixedly coupled to each other with a bolt 4 that serves as a coupling member.

The lateral direction of the vehicle coincides with the axial direction of the wheel support device 1. The hub unit 10 and the joint 30 are provided side by side in the lateral direction of the vehicle. The hub unit 10 is provided outward of the joint 30 in the lateral direction, and the joint 30 is provided inward of the hub unit 10 in the lateral direction. In FIG. 1, the right side is one side in the axial direction (inner side in the lateral direction of the vehicle), and the left side is the other side in the axial direction (outer side in the lateral direction of the vehicle).

The hub unit 10 includes a fixed ring 11, the rotary ring 12, and balls (rolling elements) 13. The fixed ring 11 is fixed to the suspension 2 with bolts (not shown). The wheel 3 is fitted to the rotary ring 12. The balls 13 are provided between the fixed ring 11 and the rotary ring 12. The fixed ring 11 is arranged radially outward of the rotary ring 12, and a center line L of the rotary ring 12 coincides with the center line of the fixed ring 11.

The fixed ring 11 has a tubular body portion 16 and a flange portion 17. Raceway surfaces 14, 15 are formed on the inner periphery of the body portion 16. The flange portion 17 extends radially outward from the body portion 16. The flange portion 17 is fixed to the suspension 2. Thus, the hub unit 10 is fixed to a vehicle body-side member.

The rotary ring 12 has a hollow shaft portion 19, a flange portion 20, and an annular inner ring member 21. A through-hole 18 is formed at the center of the shaft portion 19. The flange portion 20 extends radially outward from a portion of the shaft portion 19, the portion being on the other side of the shaft portion 19 in the axial direction. The inner ring member 21 is fitted onto a portion of the shaft portion 19, the portion being on one side of the shaft portion 19. The through-hole 18 is formed so as to linearly extend along the center line L of the rotary ring 12. The inner ring member 21 is fixed to the shaft portion 19 by being clinched by a large-diameter portion 22. The large-diameter portion 22 is formed by plastically deforming an end portion of the shaft portion 19 radially outward, the end portion being on the one side of the shaft portion 19 in the axial direction. Raceway surfaces 23, 24 are formed on the outer periphery of the shaft portion 19 and the outer periphery of the inner ring member 21, respectively. The large-diameter portion 22 of the rotary ring 12 has an annular end face 25, the end face 25 being on one side (right side in FIG. 1) of the large-diameter portion 22 in the axial direction. First splines (spline teeth) 26 are formed in the end face 25. The first splines 26 will be described later.

The balls 13 are arranged in the circumferential direction, and are arranged in two rows. The balls 13 arranged in one of the rows roll on the raceway surfaces 14, 23, and the balls 13 arranged in the other row roll on the raceway surfaces 15, 24. The balls 13 in each row are retained at equal intervals in the circumferential direction by a cage 27. The balls 13, the fixed ring 11 and the rotary ring 12 constitute a double-row angular contact ball bearing.

The joint 30 includes an inner ring 32, an outer ring 33 and a plurality of balls 34. The inner ring 32 is fixed to an end portion of a drive shaft 31, the end portion being on the other side of the drive shaft 31 in the axial direction. The outer ring 33 is arranged radially outward of the inner ring 32. The balls 34 are arranged between the inner ring 32 and the outer ring 33. The joint 30 is a constant velocity joint in the present embodiment. The outer ring 33 has a closed-end cylindrical shape. The outer ring 33 has a tubular portion 35 and a bottom portion 36. The tubular portion 35 has a tubular shape. The bottom portion 36 is integrated with a portion of the tubular portion 35, the portion being on the other side of the tubular portion 35 in the axial direction. A small tubular portion 36a that extends toward the other side in the axial direction (outward in the lateral direction of the vehicle) is formed at the center of the bottom portion 36. A bolt hole 37 is defined by the inner periphery of the small tubular portion 36a. A threaded portion 4a that is formed at the distal end of the bolt 4 is screwed into the bolt hole 37. In the joint 30, the outer ring 33 has the function as a torque transmission ring that transmits rotary torque to the rotary ring 12 of the hub unit 10. Therefore, the bottom portion 36 of the outer ring 33 has an annular end face 38, the end face 38 being on the other side of the bottom portion 36 in the axial direction. Second splines (spline teeth) 39 that are meshed with the first splines 26 of the hub unit 10 are formed in the end face 38.

Figure 2:
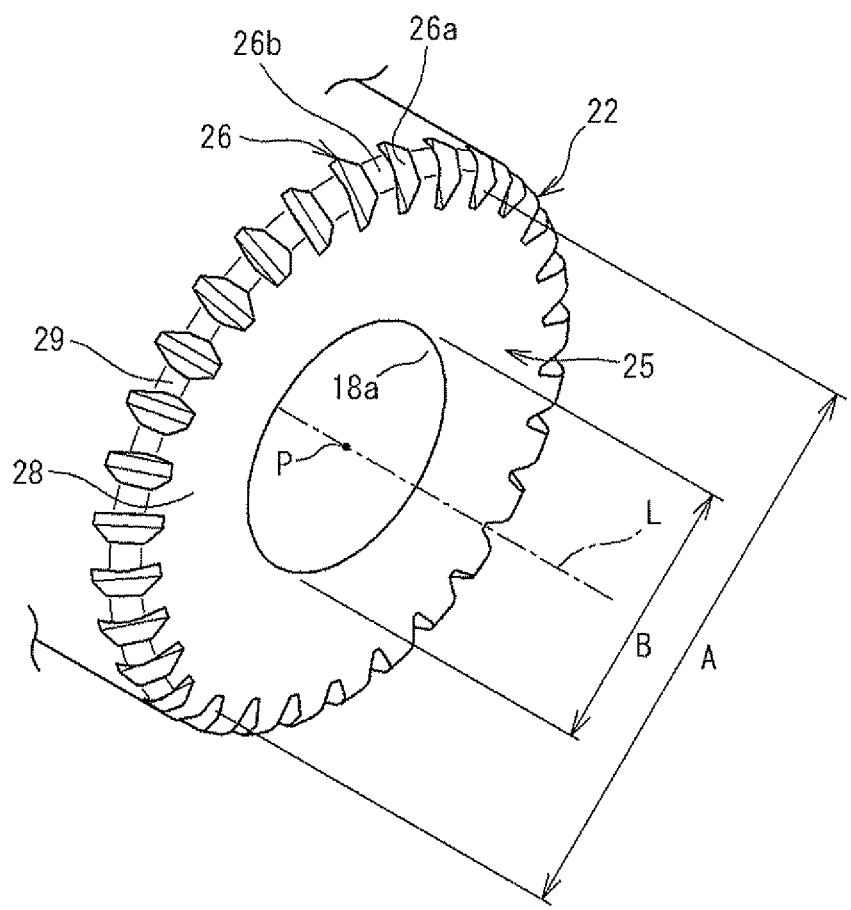
FIG. 2 is a perspective view of an end face of a rotary ring of a hub unit, the end face being on one side of the rotary ring in the axial direction.
Figure 3:
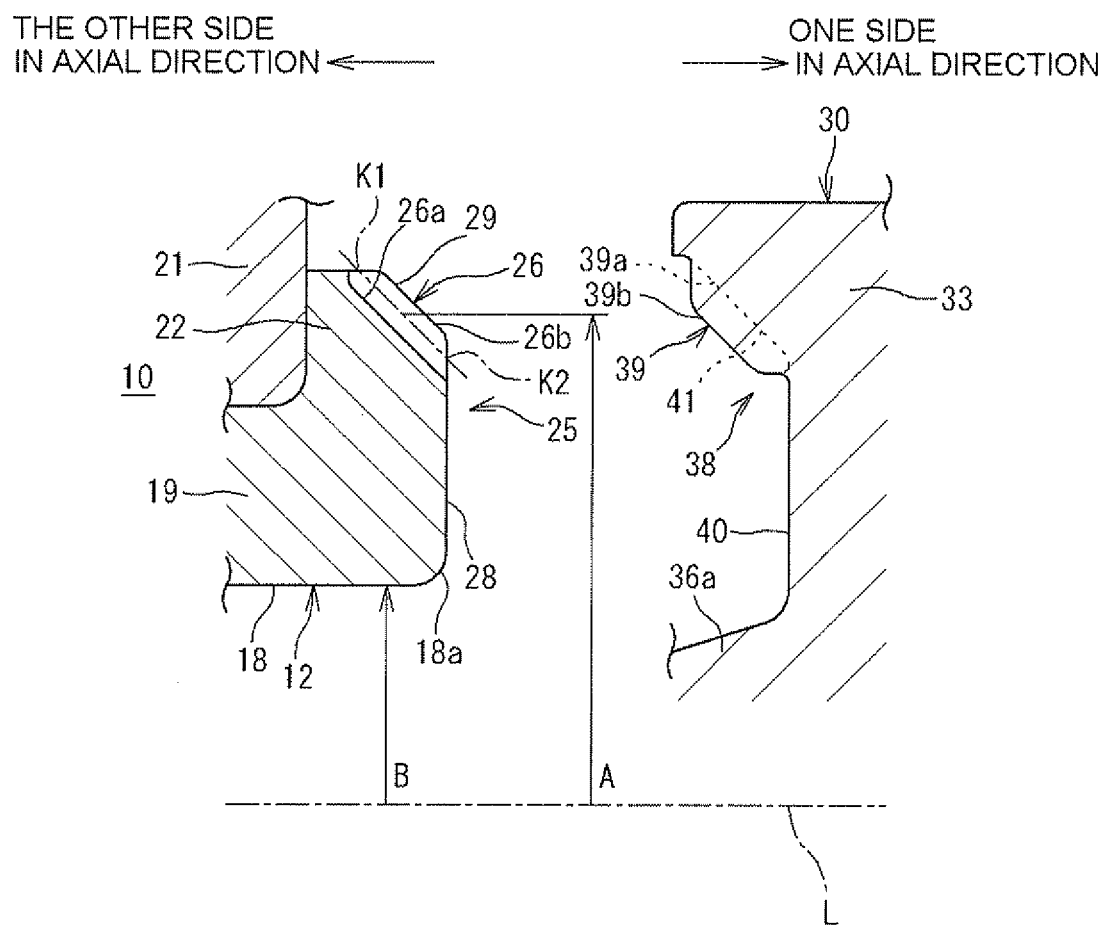
FIG. 3 is a sectional view that shows an end portion of the rotary ring of the hub unit, the end portion being on one side of the rotary ring in the axial direction, and an end portion of an outer ring of a joint, the end portion being on the other side of the outer ring in the axial direction.
Figure 4:
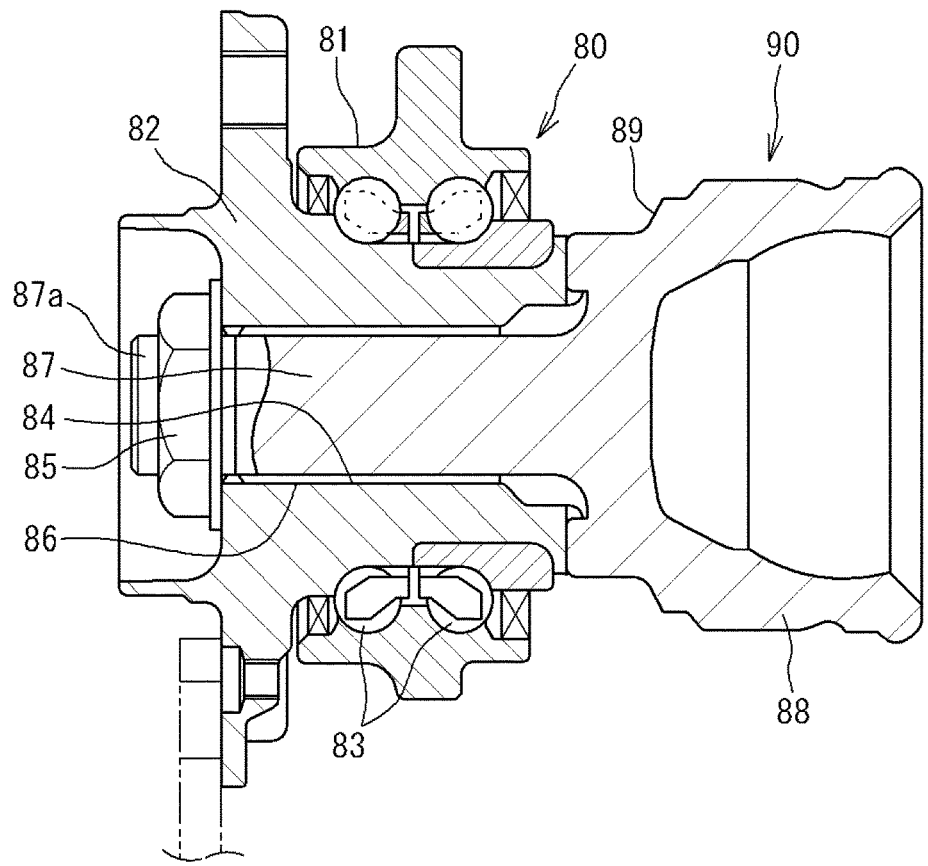
FIG. 4 is a sectional view that shows an example of a hub unit and an outer ring of a joint according to related art.

FIG. 2 is a perspective view of the end face 25 of the rotary ring 12 (large-diameter portion 22) of the hub unit 10. FIG. 3 is a sectional view that shows an end portion (large-diameter portion 22) of the rotary ring 12, the end portion being on one side of the rotary ring 12 in the axial direction, and an end portion of the outer ring 33 of the joint 30, the end portion being on the other side of the outer ring 33 in the axial direction. The large-diameter portion 22 of the rotary ring 12 has the annular end face 25, the annular end face 25 being on one side of the large-diameter portion 22 in the axial direction. The end face 25 has an annular side face 28 in a region from its inner peripheral edge to its radially intermediate position. The annular side face 28 faces toward the one side in the axial direction (inward in the lateral direction of the vehicle). The end face 25 has a tapered outer periphery 29 in a region radially outward of the annular side face 28. The diameter of the tapered outer periphery 29 increases toward the other side in the axial direction (outward in the lateral direction of the vehicle). The annular side face 28 is formed of an annular face that has an opening 18a of the through-hole 18 (see FIG. 1) at its center, and is perpendicular to the center line L of the rotary ring 12. The diameter of the tapered outer periphery 29 increases from the outer peripheral edge of the annular side face 28 toward the other side in the axial direction (outward in the lateral direction of the vehicle). The tapered outer periphery 29 is formed of an inclined surface that is inclined with respect to the center line L.

In the joint 30 shown in FIG. 3, the outer ring 33 has the annular end face 38. The annular end face 38 is on the other side of the outer ring 33 in the axial direction, and is located radially outward of the small tubular portion 36a. The end face 38 has an annular side face 40 in a region from the base portion of the small tubular portion 36a to its radially intermediate position. The annular side face 40 faces toward the other side in the axial direction (outward in the lateral direction of the vehicle). Furthermore, the end face 38 has a tapered inner periphery 41 in a region radially outward of the annular side face 40. The diameter of the tapered inner periphery 41 increases toward the other side in the axial direction (outward in the lateral direction of the vehicle). The tapered inner periphery 41 faces the tapered outer periphery 29 of the hub unit 10. In addition, the annular side face 40 faces the annular side face 28. The annular side face 40 is a face perpendicular to the center line L of the outer ring 33. The diameter of the tapered inner periphery 41 increases from the outer peripheral edge of the annular side face 40 toward the axial other side (outward in the lateral direction of the vehicle). The tapered inner periphery 41 is formed of an inclined surface that is inclined with respect to the center line of the outer ring 33.

Splines (spline teeth) are formed in the tapered outer periphery 29, and splines (spline teeth) are formed in the tapered inner periphery 41. The splines of the tapered outer periphery 29 and the splines of the tapered inner periphery 41 are meshed with each other. Via these splines, torque is transmitted between the rotary ring 12 of the hub unit 10 and the outer ring 33 of the joint 30. That is, in the hub unit 10, the first splines 26 are formed in the tapered outer periphery 29. As shown in FIG. 2, the first splines 26 are formed of spline grooves 26a and spline protrusions 26b that are formed alternately in the circumferential direction. As shown in FIG. 2 and FIG. 3, the longitudinal direction of each spline groove 26a (the longitudinal direction of each spline protrusion 26b) is a direction parallel to the tapered outer periphery 29, and the first splines 26 are formed such that the top face of each spline protrusion 26b coincides with the tapered outer periphery 29.

In the joint 30, as shown in FIG. 3, the second splines 39 that mesh with the first splines 26 of the hub unit 10 are formed in the tapered inner periphery 41. The second splines 39 are formed of spline grooves 39a and spline protrusions 39b that are alternately formed in the circumferential direction (see FIG. 3). The longitudinal direction of each spline groove 39a (the longitudinal direction of each spline protrusion 39b) is a direction parallel to the tapered inner periphery 41. The second splines 39 are formed such that the bottom face of each spline groove 39a coincides with the tapered inner periphery 41.

In the hub unit 10, a portion in which the first splines 26 are formed is the large-diameter portion 22 that is formed at the end portion of the rotary ring 12, the end portion being on one side of the rotary ring 12 in the axial direction. The large-diameter portion 22 is a portion formed by increasing the diameter of the end portion of the shaft portion 19 of the rotary ring 12 radially outward through plastic working, the end portion being on one side of the shaft portion 19 in the axial direction. In the present embodiment, the plastic working is oscillating clinching. During formation of the large-diameter portion 22 through the oscillating clinching, the first splines 26 are formed in the large-diameter portion 22. That is, although not shown in the drawing, a tooth profile for forming the first splines 26 is formed in a die member (die) used for oscillating clinching. The tooth profile of the die member is transferred to the large-diameter portion 22 so that the first splines 26 are formed.

In the present embodiment, as shown in FIG. 3, a pitch circle diameter A of the first splines 26 is set to a value that is smaller than or equal to three times of an inside diameter B of the annular end face 25 ($A \leq 3 \times B$) in which the first splines 26 are formed. The pitch circle diameter A is a value intermediate between the outside diameter (diameter at point K1) of the first splines 26 and the inside diameter (diameter at point K2). Point K1 and point K2 are each set at an intermediate position in the height direction of each spline protrusion (point at which the splines 26, 39 are in mesh with each other). The inside diameter B of the end face 25 is the diameter of the through-hole 18 in the radial direction of the through-hole 18. The inequality "$A \leq 3 \times B$" is synonymous with an inequality "$A/B \leq 3$". The inequality "$A/B \leq 3$" is an inequality that defines the ratio of the pitch circle diameter A to the inside diameter B of the end face 25.

In order to increase the torque that is allowed to be transmitted between the joint 30 and the hub unit 10, the pitch circle diameter A of the first splines 26 (and second splines 39) just needs to be increased. In order to increase the pitch circle diameter A, it is necessary to increase the outside diameter of the large-diameter portion 22. However, as described above, the large-diameter portion 22 is formed by oscillating clinching. Therefore, in order to increase the outside diameter of the large-diameter portion 22, it is necessary to broaden a region that is subjected to plastic working. This leads to an increase in man-hour for plastic working. Therefore, if the first splines 26 that satisfy the inequality "$A/B \leq 3$" are formed in the end face 25, it is possible to obtain the spline structure that allows transmission of required torque without unnecessarily increasing the size of each first spline 26 (pitch circle diameter A) in the radial direction. The pitch circle diameter A is, of course, larger than the inside diameter B ($B<A$). In order to allow transmission of required torque, it is desirable to further satisfy an inequality "$1.3 \times B \leq A$".

In the wheel support device 1 according to the above-described embodiment, the region in which the first splines 26 are formed is only the radially outer region of the end face 25 of the rotary ring 12 of the hub unit 10, and the region in which the second splines 39 are formed is only the radially outer region of the end face 38 of the outer ring 33 of the joint 30. By forming the splines in only part of each of the end faces 25, 38 instead of forming the splines in the entirety of each of the end faces 25, 38, an application load that is required to form the splines through oscillating clinching is made smaller than that in the case where the splines are formed in the entirety of each of the end faces 25, 38. Therefore, it is possible to accurately form the splines. Furthermore, while the spline are formed in only part of the end faces 25, 28, the splines 26 of the hub unit 10 are formed in the tapered outer periphery 29 of which the diameter increases toward the other side in the axial direction (outward in the lateral direction of the vehicle), and the splines 39 of the joint 30 are formed in the tapered inner periphery 41 of which the diameter increases toward the other side in the axial direction (outward in the lateral direction of the vehicle). Therefore, it is possible to make the length of each spline tooth substantially equal to that in the conventional spline structure in which the splines are formed on the entirety of each surface. Therefore, it is possible to transmit torque that is substantially equal to that in the conventional spline structure.

In addition, the splines 26, 39 are formed in the radially outer regions of the end faces 25, 38 instead of being formed in the radially inner regions of the end faces 25, 38. Thus, it is possible to increase the pitch circle diameter A of the splines 26, 39. In this way, it is possible to obtain the spline structure that allows transmission of a large torque.

As shown in FIG. 1, the hub unit 10 and the joint 30 according to the present embodiment are assembled together in the following manner. First, the rotary ring 12 of the hub unit 10 and the outer ring 33 of the joint 30 are arranged so as to face each other in the axial direction. Then, the first splines 26 formed in the end face 25 of the rotary ring 12 and the second splines 39 formed in the end face 38 of the outer ring 33 are meshed with each other. After that, the hub unit 10 and the joint 30 are fastened together with the bolt 4. In this way, in order to allow transmission of torque between the rotary ring 12 and the outer ring 33, it is only necessary to bring the rotary ring 12 and the outer ring 33 close to each other in the axial direction, and mesh the first splines 26 of the rotary ring 12 and the second splines 39 of the outer ring 33 with each other. Therefore, assembly is easily performed.

The bolt 4 is a member that couples the rotary ring 12 and the outer ring 33, which are arranged so as to extend along the same straight line, by fastening the rotary ring 12 and the outer ring 33 to each other in the axial direction. The bolt 4 has a bolt head 4b and a threaded portion 4a. The bolt head 4b is larger in diameter than the through-hole 18 of the rotary ring 12. The threaded portion 4a is screwed into the bolt hole 37 that is formed in the outer ring 33. The distal end portion (threaded portion 4a) of the bolt 4 is inserted into the through-hole 18 from the other side in the axial direction, and is screwed into the bolt hole 37. In this way, the bolt 4 couples the rotary ring 12 to the outer ring 33 by fastening the rotary ring 12 to the outer ring 33 in the axial direction. In a state where the bolt 4 is fastened and an axial tension acts on the bolt 4, the hub unit 10 and the joint 30 are coupled to each other and rotary torque is transmitted from the joint 30 to the hub unit 10.

The wheel support device according to the invention is not limited to the one in the illustrated embodiment, and may be implemented in various other embodiments within the scope of the invention. For example, the joint 30 may be a joint other than the constant velocity joint. In the above-described embodiment, a torque transmission ring of the joint 30 is the closed-end cylindrical outer ring 33 (see FIG. 1). Alternatively, a torque transmission ring may be a member that has another shape.

With the wheel support device according to the invention, while the splines are formed in only part of each end face, it is possible to make the length of each spline tooth substantially equal to that in the conventional spline structure. Therefore, it is possible to transmit torque that is substantially equal to that in the conventional spline structure.

What is claimed is:

1. A wheel support device, comprising:
a hub unit that includes a fixed ring that is fixed to a vehicle body-side member, a rotary ring to which a wheel is fitted, and rolling elements that are provided between the fixed ring and the rotary ring; and
a joint that is provided on one side of the hub unit in an axial direction, and that has a torque transmission ring that transmits rotary torque to the rotary ring, wherein the rotary ring has an annular end face on one side in the axial direction and a tapered outer periphery, the annular end face having an annular side face formed in a region extending from an inner peripheral edge of the annular end face to the a radially intermediate position of the annular end face, the tapered outer periphery being formed in a region radially outward of the annular side face, a diameter of the tapered outer periphery increasing toward the other side in the axial direction,
the torque transmission ring has an annular end face on the other side in the axial direction and a tapered inner periphery, the annular end face having an annular side face, the annular side face facing the other side in the axial direction, the tapered inner periphery being formed in a region radially outward of the annular side face, a diameter of the tapered inner periphery increasing toward the other side in the axial direction and the tapered inner periphery facing the tapered outer periphery of the rotary ring, and
splines are formed only in the tapered outer periphery of the rotary ring and splines are formed only in the tapered inner periphery of the torque transmission ring, and the splines of the tapered outer periphery of the rotary ring and the splines of the tapered inner periphery of the torque transmission ring mesh with each other.

2. The wheel support device according to claim 1, wherein a pitch circle diameter of the splines that are formed in the rotary ring is smaller than or equal to three times of an inside diameter of the annular end face that is formed on one side of the rotary ring in the axial direction.

* * * * *